Dec. 12, 1933.  A. SIMONS  1,939,469
FOWL PLUCKER
Filed March 14, 1931  2 Sheets-Sheet 2
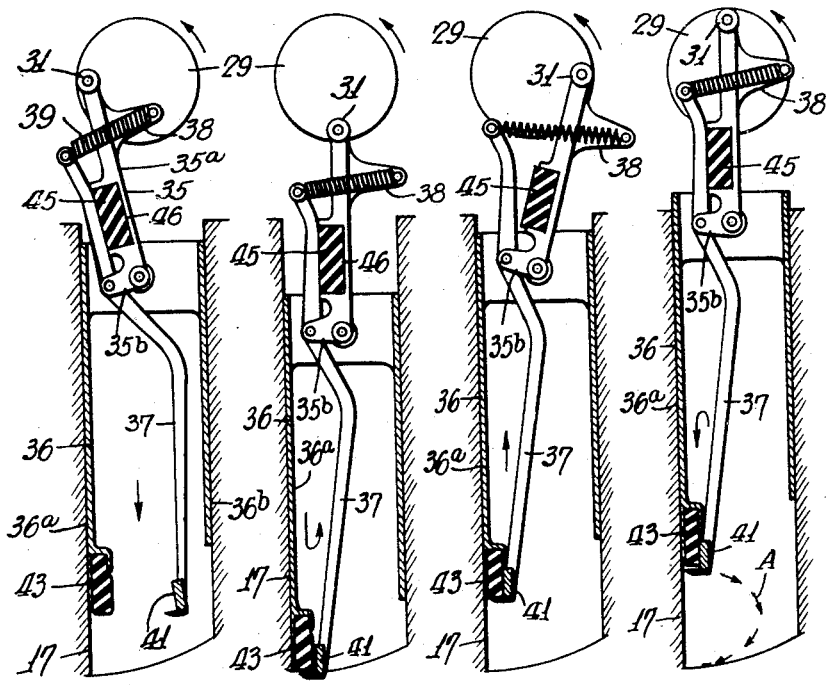
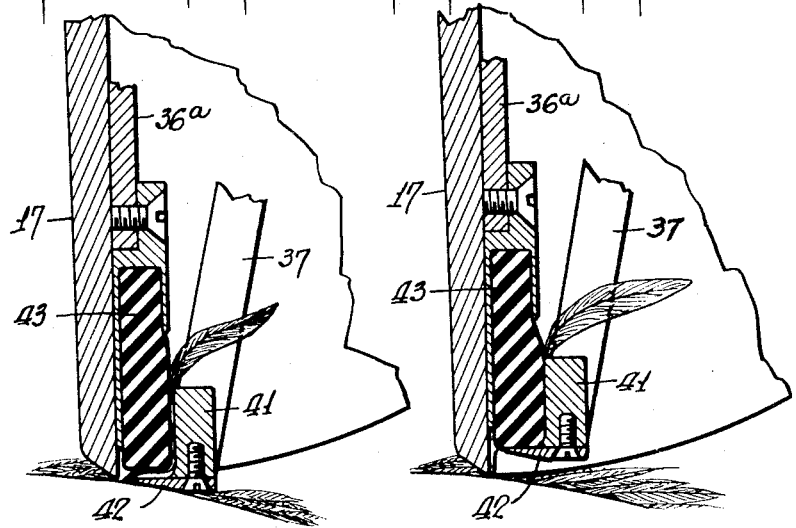
INVENTOR
Aaron Simons
BY
ATTORNEYS Patented Dec. 12, 1933

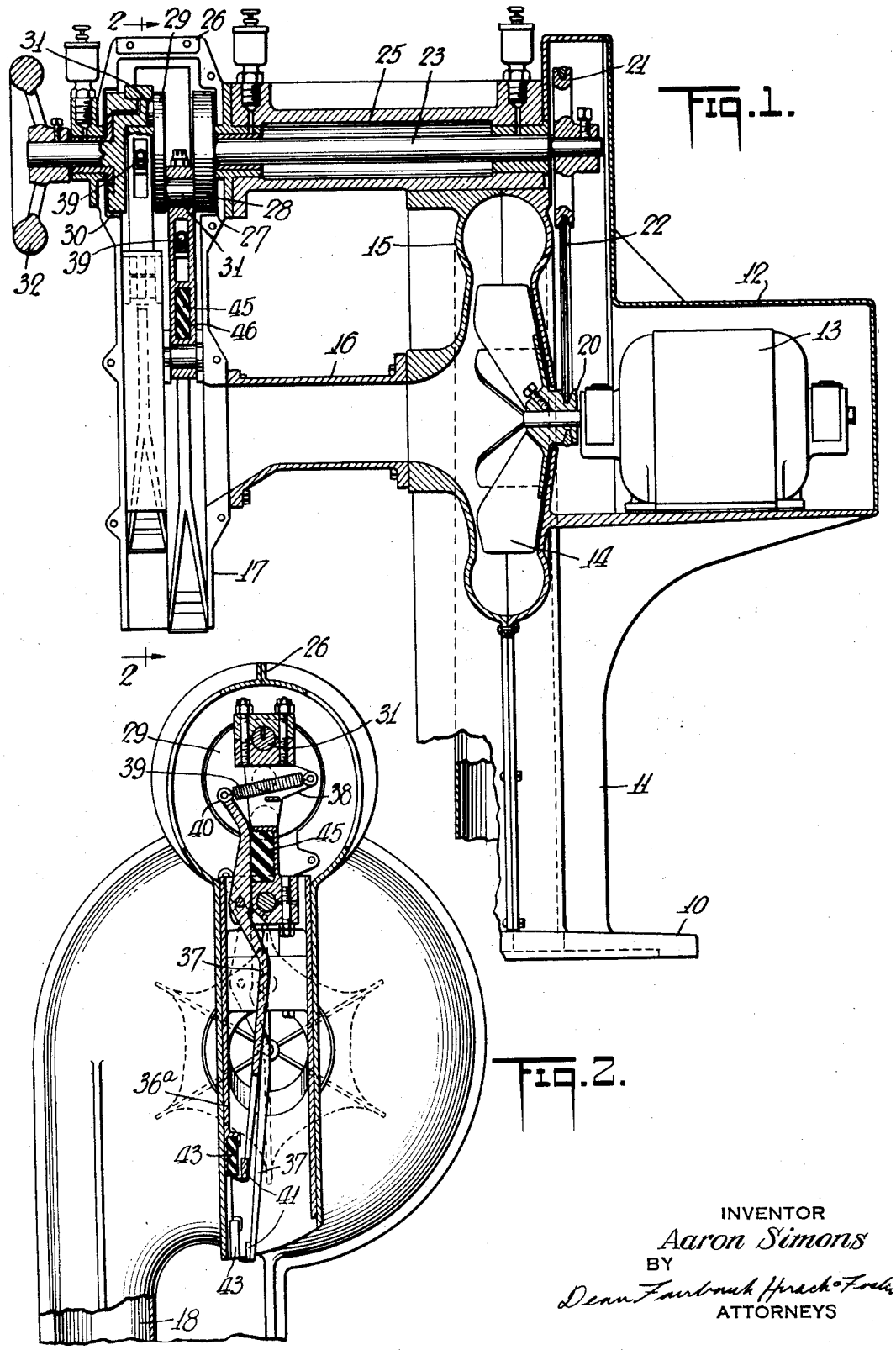

1,939,469

UNITED STATES PATENT OFFICE 1,939,469

FOWL PLUCKER

Aaron Simons, Bronx, N. Y.

Application March 14, 1931. Serial No. 522,601

9 Claims. (Cl. 17—11)

To pluck fowls, it has been proposed to provide an apparatus in which the feathers are drawn by a vacuum to an upright position, and in which feather gripping elements are provided which reciprocate in a direction substantially parallel to the surface of the fowl, these elements moving towards the feathers to grip them, and receding along the same general direction to pluck them. The feathers have quills embedded in the flesh in a direction inclined with reference to the surface, so that these feathers are disposed in an overlying position with respect to the skin. If the fowl is turned in a direction in which the embedded quills are inclined away from the reciprocating gripping elements, greater force will be required to pluck the feathers. Furthermore, in this position it will be difficult to remove the smaller feathers.

It has also been proposed to remove the feathers by a plucking operation in a direction substantially at right angles to the surface of the fowl, there being provided for that purpose intermeshing rotary elements which serve to grip the feathers therebetween and pluck them. However, this type of apparatus does not permit the positioning of the intermeshing portion of the elements sufficiently close to the surface of the fowl to remove the short feathers.

One object of the present invention is to provide an apparatus having a pair of gripping elements which move in a direction substantially at right angles to the surface of the fowl, and along a substantially straight line after the feathers have been gripped therebetween. This permits the gripping elements to move very close to the skin of the fowl to grasp the feathers, and permits the fowl to be disposed in any position with respect to the gripping elements without materially affecting the efficiency of the plucking operation.

Another object of the invention is to provide an apparatus having reciprocating gripping elements operating in a duct connected to a suction blower for urging the feathers in an upright position with respect to the surface of the fowl to facilitate the grasping of the feathers.

A further object of the present invention is to provide gripping elements having a cycle of movement which permits the use of a duct of comparatively small cross-section area. This permits a smaller opening for the duct and a more effective sucking action in urging the feathers in an upright position.

In a specific embodiment of the present invention, there is provided a gripping member, one element of which reciprocates along a straight line, and the cooperating element has a movement, first into holding relationship with the first mentioned element to grasp the feathers therebetween, then away from the surface of the fowl, and at a faster rate than the first mentioned member to firmly grasp the feathers therebetween, and thereafter away from the surface of the fowl along with the first mentioned member to pluck the feathers.

In the accompanying drawings, there is shown for purposes of illustration, merely one of many possible embodiments of the invention, and in which Fig. 1 is a vertical longitudinal section taken through the center of the apparatus.

Fig. 2 is a vertical transverse section taken on line 2—2 of Fig. 1.

Figs. 3, 4, 5 and 6 show the gripping elements of the apparatus in the various positions during their cycle of operation, and Figs. 7 and 8 show details of the gripping portion of the gripping elements on a larger scale and in positions corresponding to the positions shown in Figs. 4 and 5 respectively.

For the purpose of illustration, the present invention is shown as applied to a type of plucking machine in which a motor is provided for operating the exhaust fan and gripping elements. This particular type is not intended to define the limits of the invention, it being understood that as far as the drive for the gripping elements and the exhaust fan is concerned, any suitable type may be employed.

In the specific construction of the invention shown, there is provided a base 10, supporting a standard 11, having a housing 12 enclosing a source of driving power, for instance, an electric motor 13. This motor drives an exhaust blower which may be a bladed rotor 14 mounted on the motor shaft and enclosed in a blower volute casing 15. The inlet of the casing is connected by a conduit 16 to a duct 17, and the outlet terminates in a duct 18 which may be connected to a bag or other receptacle for collecting the plucked feathers.

The motor 13 also operates the gripping elements of the apparatus, the driving connection being advantageously such as to permit slippage under excessive loads. For that purpose, there are provided a grooved drive pulley 20 on the shaft of the motor 13, a grooved driven pulley 21, and a connecting belt 22. The pulley 21 is mounted on one end of a crank shaft 23 which is journaled in bearings formed at the ends of the sleeve 25 supported on the casing of the exhaust blower. Attached to one end of this sleeve 25 is a housing 26 in which is enclosed one or more cranks on the crank shaft 23.

It is advantageous to provide a multi-throw crank in order to effect a more continuous plucking operation and to minimize unbalanced conditions and shocks incident to the operation of a single crank wheel. In the form shown, there is provided a double throw crank 27 including three crank disks 28, 29 and 30 connected in series by two diametrically opposed crank pins 31 for operating two pairs of gripping or plucking members in opposite phase.

The disk 30 has an axial extension or stub shaft which extends beyond the housing 26, and which has fixed thereto a hand wheel 32 to permit turning of the crank shaft by hand, or to permit stopping or braking of the operation, the rope drive from the motor 13 permitting slippage for this operation.

The most important feature of the present invention is involved in the construction of the gripping elements and their cycle of operation. This cycle of operation includes the movement of a pair of gripping elements into position to hold the feathers therebetween; the relative movement of one gripping element in respect to the other in the direction of the length of the feathers to firmly grip the feathers therebetween, and the simultaneous movement of the elements away from the surface of the fowl to pluck the feathers. In the construction shown, this cycle of operation is effected through the agency of a bell crank lever 35 pivotally connected intermediate of its two arms to one end of a slide 36 which is shown as a tubular cross-head rectangular in cross-section, and having extensions 36a and 36b. This cross-head is adapted to reciprocate in the duct 17, the walls of the latter acting as a guide for said cross-head and extensions. The duct 17 is large enough to accommodate two such cross-heads 36 operating in sliding contact with each other and enclosing similar pairs of gripping members. One end of an arm 35a of each bell crank 35 is pivotally connected to a crank pin 31, so that said arm acts as a connecting rod between the crank and the cross-head 36. The other arm 35b extends substantially transverse to the path of the cross-head, and one end has pivotally connected thereto a gripping element in the form of a rod or lever 37. This rod 37 has the intermediate portion thereof offset so that when its lower end portion is disposed in a position parallel to the axis of the cross-head 36, it is disposed proximate the right-hand wall of the cross-head, as shown in Fig. 3.

The arm 35a of the bell crank lever is provided with a lug 38 connected to one end of a spring 39, the other end of the spring being connected to the upper end of the rod 37. The lower portion of the rod 37 is bifurcated, and has formed between the prongs thereof a member 41, the underside of which has screwed or otherwise connected thereto a gripping plate 42. Mounted on the cross-head extension 36a and adapted to cooperate with the gripping end of the rod 37 is a block 43. It is desirable to effect a resilient gripping relationship between this block and the lower gripping portion of the rod 37, and for that purpose, the block 43 is constructed of rubber or other suitable resilient material. If desired, the resilient element may be mounted on the rod 37. Also to obviate the noise incident to the periodic clashing of the upper portion of the rod 37 with the arm 35a of the bell crank lever 35, a pad 45 of resilient material may be mounted on the arm 35a or the rod 37, but which is shown seated in a groove 46 formed in said arm.

One gripping member has been described as connected to one of the crank pins, it being understood that a similar gripping member is connected to the other crank pin, these crank pins being set 180° apart.

In the operation of the gripping elements, when the crank is turning counterclockwise from the position shown in Fig. 3, the block 43 and the gripping portion of the rod 37 are moving downwardly. At the same time, the bell crank lever 35 is moving in a clockwise direction, so that the pivot point of the rod 37 is moving downwardly, but at a slower speed than the cross-head 36. Under these conditions, the block 43 is moving downwardly faster than the gripping portion of the rod 37. At the same time, while these elements are moving downwardly, they are approaching each other into feather grasping position until they reach the position shown in Fig. 4. In this position the side of the member 41 is pressed in contact with the rubber block 43 under the action of the spring while the gripping plate 42 is spaced from the end of said block.

The feathers of the fowl, under the action of the exhaust fan will be disposed substantially at right angles to the surface of said fowl so that as the gripping elements move into close relationship, the feathers are held therebetween in offset position as defined by the angular relationship of the gripping plate 42 and the member 41. As soon as the crank wheel passes the dead center position shown in Fig. 4, the gripping elements will start in their upward movement. During this upward movement, the bell crank lever 35 will still be swinging in a clockwise direction, so that the pivot point of the rod 37 will be moving upwardly with respect to the cross-head 36, thereby causing said rod to move upwardly at a faster rate than the upward movement of the cross-head. This relative movement will continue until the plate 42 is moved into firm gripping relationship with the underside or end of the rubber block 43 to compress and distort the latter. At the same time, the angle between the upper portion of the rod 37 and the arm 35a will be increasing, the increased tension of the springs 39 caused thereby causing the face or side of the block 41 to more firmly engage the side of the rubber block 43. This operation takes place during the initial upward movement of the gripping elements, and reaches a condition of maximum gripping pressure therebetween at the position shown in Fig. 5.

After the crank has passed the position shown in Fig. 5, the bell crank lever 35 will begin to turn in a counterclockwise direction, so that the continued upward movement of the cross-head 36 will be faster than the upward movement of the gripping end of the rod 37. This operation effects the release of the endwise pressure on the block 45, and finally the endwise separation of the gripping plate 42 and the block 43 at or before they reach the position shown in Fig. 6.

After the gripping member has reached the position shown in Fig. 6, the bell crank lever 35 will continue to rotate in a counterclockwise direction, and due to its abutting engagement with the upper portion of the rod 37, the lower portion of said rod will move away from the block 43 along a curved path A, until said portion reaches the position shown in Fig. 3. This separating operation permits the release of the plucked feathers which then travel through the duct 16 and the duct 18, into a suitable receptacle.

Having thus described my invention, what I claim as new and desire to secure by Letters Patent is:—

1. A fowl plucking device including a pair of cooperating feather plucking elements, a crank shaft, a connecting rod connected to said crank-shaft for reciprocating one of said elements, said rod having a laterally projecting extension, and a rod pivoted on said extension for moving the other element in respect to the first element.

2. In combination, a pair of cooperating feather plucking elements, a slide carrying one element, a lever carrying the other element, a bell crank lever having its fulcrum pivoted to said slide and one arm pivoted to the first lever, a rotary crank pivoted to the other arm of said bell crank lever, and means yieldingly resisting but permitting swinging movement of said first lever in respect to said bell crank lever.

3. A fowl plucking device including a crank shaft, a cross-head, a rod connecting said cross-head and said crank shaft, a first feather plucking element mounted for reciprocating movement with said cross-head, a second feather plucking element, and means for moving said second gripping element into feather gripping relationship with said first element, and then along the direction of said first element to pluck the gripped feathers.

4. A fowl plucking device including a drive shaft, an exhaust fan driven thereby and enclosed in a casing, a tubular member extending in a horizontal position above said fan, a crank shaft mounted in said tubular member, means for driving said crank shaft from said drive shaft, a duct having an open end and extending downwardly from one end of said tubular member, a feather plucking member disposed in said duct, and operatively connected to said crank shaft, and a conduit disposed below said tubular member, extending substantially parallel thereto and connecting the inlet of the fan casing with said fan.

5. A fowl plucking device, including a pair of cooperating feather plucking elements, a rotary member, a link pivotally connected to one of said elements and to said rotary member, a guide for limiting the movement of said last mentioned element to a straight line reciprocating movement, a member pivotally connected to and carried by said link and carrying the other of said elements, and means engaging said last mentioned member for moving the other element in a direction substantially at right angles to the line of movement of the first mentioned element and into engagement with the terminal portion of said first mentioned element, and then moving it in a straight line parallel to the direction of movement of said first mentioned member.

6. A fowl plucking device, including a cross-head, a guide for limiting the movement thereof to a straight line, a fowl plucking member secured to said cross-head for movement therewith, a bell crank lever pivoted to said cross-head, a rotary member connected to one arm of said bell crank lever, a lever pivoted intermediate of its ends to the other arm of said bell crank lever, and yielding connections between one end of said last mentioned lever and said first mentioned arm of said bell crank lever, the other of said fowl plucking elements being carried by the other end of said lever.

7. A fowl plucking device including a pair of feather gripping elements, supporting members therefor, means for guiding one of said elements in a straight line reciprocatory movement, a rotary member, and a member pivotally connected to said rotary member and to both of said elements for reciprocating the first mentioned element and for moving the other element in a curved path spaced from the first mentioned element during movement of the latter in one direction, and in a straight line parallel to the path of movement of the first mentioned element during the return movement of the latter.

8. A fowl plucking device, including a pair of cooperating feather plucking elements, a member having pivotal connections to one of said elements and separate pivotal connections to the other of said elements, and a rotary member having pivotal connections to said first mentioned member for imparting relative movement to said elements.

9. A fowl plucking device, including a cross-head, means for guiding it for straight line movement, a feather gripping element connected to said head for straight line movement therewith, a rotary member, a connecting rod connecting said rotary member and said cross-head, a lever pivoted intermediate of its ends to said connecting rod, a spring connecting one end of said lever and said connecting rod, and a second feather gripping element carried by said lever at the opposite end of the latter.

AARON SIMONS.